(12) United States Patent
Noufal et al.

(10) Patent No.: US 12,111,436 B2
(45) Date of Patent: Oct. 8, 2024

(54) METHOD AND SYSTEM FOR DETERMINING A LOCATION OF HYDROCARBON RESERVOIRS

(71) Applicant: Abu Dhabi National Oil Company, Abu Dhabi (AE)

(72) Inventors: Abdelwahab Noufal, Abu Dhabi (AE); Khalid Obaid, Abu Dhabi (AE)

(73) Assignee: Abu Dhabi National Oil Company, Abu Dhabi (AE)

(*) Notice: Subject to any disclaimer, the term of this patent is extended or adjusted under 35 U.S.C. 154(b) by 314 days.

(21) Appl. No.: 17/644,948

(22) Filed: Dec. 17, 2021

(65) Prior Publication Data
US 2022/0196862 A1 Jun. 23, 2022

(30) Foreign Application Priority Data
Dec. 21, 2020 (EP) .................................. 20216242

(51) Int. Cl.
*G01V 1/28* (2006.01)
*G01V 1/30* (2006.01)

(52) U.S. Cl.
CPC .............. *G01V 1/282* (2013.01); *G01V 1/301* (2013.01); *G01V 2210/1234* (2013.01)

(58) Field of Classification Search
CPC .............. G01V 1/282; G01V 1/301; G01V 2210/1234; G01V 20/00; G01V 1/30; G01V 1/306; G01V 2210/6244; G01V 2210/6246; G01V 2210/6248; G01V 2210/661
See application file for complete search history.

(56) References Cited

U.S. PATENT DOCUMENTS

| 8,494,827 | B2 | 7/2013 | Mutlu et al. |
| 8,903,659 | B2 | 12/2014 | Van Hoek et al. |
| 9,733,391 | B2 | 8/2017 | Dimitrov et al. |
| 11,767,756 | B2 * | 9/2023 | Obaid .................. G01V 99/00 702/2 |
| 2012/0029828 | A1 | 2/2012 | Pepper et al. |

(Continued)

FOREIGN PATENT DOCUMENTS

| CN | 114779363 A * | 7/2022 | ........... E21B 49/087 |
| EP | 4016137 A1 * | 6/2022 | ............. G01V 1/282 |

(Continued)

OTHER PUBLICATIONS

Search and Examination Report issued by the Patent Office of the United Arab Emirates for the corresponding Emirati Patent Application No. P6002348/2021.

*Primary Examiner* — Daniel Pihulic
(74) *Attorney, Agent, or Firm* — Renner, Otto, Boisselle & Sklar, LLP (57) ABSTRACT

The present invention relates to a method for determining a location of hydrocarbon reservoirs using a mechanical properties model of a subsurface geological area. The method comprises the steps of: creating a plurality of presumed seismic sections at the time of deposition based on a seismic interpretation of the subsurface geological area and influences of tectonic time data and tectonic pressure data; creating a mechanical properties model of the subsurface geological area based on the plurality of presumed seismic sections at the time of deposition and the influences of tectonic time data and tectonic pressure data.

7 Claims, 4 Drawing Sheets

(56) References Cited

U.S. PATENT DOCUMENTS

| | | | |
|---|---|---|---|
| 2014/0067351 A1 | 3/2014 | Gray et al. | |
| 2017/0167254 A1 | 6/2017 | Fotland | |
| 2017/0177764 A1 | 6/2017 | Guy et al. | |
| 2020/0073012 A1 | 3/2020 | Frazer et al. | |
| 2022/0120933 A1* | 4/2022 | Noufal | G01V 11/002 |
| 2022/0195870 A1* | 6/2022 | Obaid | G01V 99/00 |
| 2022/0196862 A1* | 6/2022 | Noufal | G01V 20/00 |

FOREIGN PATENT DOCUMENTS

| | | |
|---|---|---|
| WO | 2010/110824 A1 | 9/2010 |
| WO | 2019/231681 A1 | 12/2019 |

* cited by examiner

METHOD AND SYSTEM FOR DETERMINING A LOCATION OF HYDROCARBON RESERVOIRS

This application claims priority of European Patent Application No. 20216242.6, filed Dec. 21, 2020, the entire disclosure of which is hereby incorporated by reference.

CROSS REFERENCE TO RELATED APPLICATIONS

None

FIELD OF THE INVENTION

The present invention relates to geologic modelling and, in particular, to a method and a system for creating a mechanical properties model of a subsurface geological area, and for determining a location of hydrocarbon reservoirs.

BACKGROUND TO THE INVENTION

Geologic modelling is used to create a computer-based representation of a region of the earth subsurface which is termed a geologic model. Such geologic models can then be used to model a hydrocarbon reservoir or a depositional basin. The geologic model can be used for many purposes. For example, the geologic model can be used as input to a computer program that simulates the movement of fluids within the modeled subsurface region. These computer programs can then be used to predict hydrocarbon production rates, volumes of hydrocarbon reservoirs as a function of time, or for a prediction of the presence of hydrocarbon reservoirs.

The geologic modelling of the subsurface area can be based on different geological features, such as clinoforms or plummets. Clinoforms are sloping subsurface depositional structures and are well known in the field of structural geology. These depositional structures are formed by the regression of continental shelf as sea levels fall. Clinoforms therefore describe two-dimensional surfaces that can be defined as extending from a wave base (below sea level) down to a generally flat basin floor. Due to this erosion-based formation process, the clinoforms are usually formed in regions with rock having a fine grain size (as can be found in silt or clay), a thin and even bedding, and show the presence of linear flow markings due to the regression of the sea water. Many of the subsurface structures found in Abu Dhabi, UAE, have been, in the past, related to the regression of the sea level and are therefore described as clinoforms.

However, certain structural and tectonic impacts seen in the subsurface regions of Abu Dhabi show features or properties which cannot be explained using formation model for the clinoforms described above. Therefore, the depositional surfaces found in Abu Dhabi need to be characterized using different criteria and methods. The depositional surfaces of Abu Dhabi often show complex sediment accumulations which can be termed "plummets". These plummets are difficult to map and a new method is needed in order to reliably simulate the formation of these depositional surfaces.

The plummets are well studied from a structural, stratigraphic and sedimentological point of view. The plummets also describe, unlike the clinoforms, an evaluation of the tectonic impact which leads to the complex layout of layers of the sediment. The plummets are observed in many reservoirs of the Abu Dhabi fields and can especially be found in Aptian-aged, in Turonian/Coniacian-aged, Berriasian-Valangnian-aged, and Tithonian-aged formations. All of the aforementioned formations have in common that the formations are carbonate formations. These carbonate formations usually contain significant volumes of hydrocarbons in Abu Dhabi.

Understanding the formation of the plummets improves the reliability of the identification and development of the hydrocarbon accumulations, or fields, found in the subsurface area of Abu Dhabi. The plummets are not, unlike the clinoforms, a sedimentological feature. The plummets moreover originated from the impact of tectonic activity that worked simultaneously with the sediment supply, leading to the formation of belts of plummets parallel to controlling fault lines or major fault lines. The plummets are usually only found parallel to the major fault lines prevailing in Abu Dhabi. In addition, the oscillation of the sea level over the course of time, in combination with the tectonic activity of the subsurface area, support that the growth of the plummets is typically characterized by a tectonic event.

The plummets are characteristic of basin margin strata and can be defined as a two-dimensional surface with a sigmoidal (sloped) geometry. Evidence of the existence of the plummets can be recognized in seismic, well log and outcrop data, and are used to define basin margins, stacking patterns and shelf-edge trajectories. Paleo basin depths and relative sea level fluctuations are also inferred from the heights and geometries of plummets. Therefore, a deeper understanding of the formation of the plummets is useful for sequence stratigraphy and basin analysis and this understanding leads to more accurate predictions for the location and the dimension of subsurface hydrocarbon accumulations.

It is, however, necessary to update the models of the Abu Dhabi fields in order to improve the recovery factor of the hydrocarbons, as a heterogeneous reservoir will not be depleted equally throughout the field. Therefore, it is useful to gain insight into the build-up of specific target areas within a reservoir to evaluate factors that have the largest influence on the production and the recovery of hydrocarbons from the reservoir, like compartmentalization, flow paths and patterns of faults. The term "compartmentalization" is used in this context to define a geological segmentation of once continuous reservoirs into isolated compartments. The fault is a planar fracture or discontinuity in a volume of rock across which there has been significantly displacement as a result of rock-mass movements.

PRIOR ART

A number of patent documents are known which relate to the creation of a mechanical properties model of a subsurface geological area. For example, granted U.S. Pat. No. 9,733,391 B2 (Dimitrov et al.; assigned to ExxonMobil Upstream Research Company) relates to a method and system for modeling one or more geophysical properties of a subsurface volume. The method comprises obtaining subsurface volumes, obtaining an interpretation of the subsurface volume, defining flexible geologic concepts, and applying, by a computer system, one or more geologic concepts to the interpretation of the subsurface volume. The method further comprises flexible geologic concepts for obtaining a modified interpretation of the subsurface volume based upon the applied geologic concepts. In particular, the method and system of this application involve interpreting and analyzing geophysical and geological data using a computer. The patent describes a method and system for a repeatable calculation of subsurface structures using geological input data and a computer system. The method described includes the calculation of stacking patterns for different layers of subsurface structures and the interaction of these. The method disclosed in the US patent does not, however, explicitly go into detail on the effect of progradational surfaces for the prediction of the presence of hydrocarbon reservoirs.

Granted U.S. Pat. No. 8,903,659 B2 (Gesbert et al.; assigned to Shell Oil Company) describes a method for the stratigraphic analysis of seismic data. The method comprises selecting a seismic data volume, selecting several horizons or layers within the seismic data volume, and selecting a scale of interest within the seismic data volume. An attribute function is then applied to at least one of the selected number of horizons at the selected scale of interest. The patent describes a method for calculating large scale geological features of subsurface structures using geological input data and a computer system. The method calculates, using different geological sources, the basin development over time. However, a model specifically designed to incorporate the mechanical properties of the subsurface geological area is not described.

The international patent application WO2019/231681 A1 (Mezghani et al.; assigned to Aramco Services Co. and; Saudi Arabian Oil Co.) discloses a method for stratigraphic modeling using linear and nonlinear algorithms. In a first step, a defined scope value is selected for each of a plurality of hydrodynamic input parameters. A simulated topographical result is generated using the selected scope values and a forward model. A detailed seismic interpretation is generated to represent specific seismic features or observed topography. A calculated deviation value representing a distance between the simulated topographical result and a detailed seismic interpretation is offered. A deviation value is then calculated from thickness and porosity data extracted from well data and a simulation result is generated. The patent application describes a method for predicting subsurface petroleum reservoirs. A focus lies in the prediction of hydrocarbon reservoirs using forward stratigraphic modeling. However, the patent application does not disclose a method for the prediction of subsurface reservoirs using the mechanical properties of the subsurface geological area and the formation processes involved in the entrapment of hydrocarbon reservoirs.

The international patent application WO2010/110824 A1 (Benson et al.; assigned to ExxonMobil Upstream Research Company) discloses a method in which an expression is selected to approximate measurement-based values of a geologic attribute along a dimension of a subsurface formation. Values for terms of the expression are determined such that the expression satisfies an objective function to within a predetermined amount. The objective function indicates a difference between outputs of the expression and the measurement-based values at similar points along the dimension. The expression and the values of the terms of the expression are outputted, which includes mapping the terms of the expression to represent the geologic attribute in the subsurface formation such that the geologic attribute is described at all locations in the subsurface formation using the expression and the values of the terms of the expression. The patent application describes a theoretical method for the calculation for the determination of the presence of underground hydrocarbon-bearing reservoirs. However, the patent application's focus lies on theoretically modeling underground patterns without further going into the mechanical aspects that are predominant in the formation of subsurface structures.

U.S. Pat. No. 8,494,827 B2 (Dasari et al.; assigned to ExxonMobil Upstream Research Company) describes a method for predicting localized damage and naturally occurring fractures in subsurface regions. The invention uses a hybrid FEM-DEM (i.e. finite-discrete element) framework combined with a fracture risking analysis and fracture initiation and propagation criteria to model the transition of rock from a state of continuum to discontinuum. A risk-analysis combines results from other natural fracture prediction tools to augment FEM-DEM solutions, such as by providing remote and local boundary conditions and identifying potential regions of anticipated damage and fracturing. Natural fractures and damage information is extracted from the modeling results and may be used directly for predictions or used as input into other fracture analysis tools or techniques. The FEM-DEM and risk-analysis techniques can be incorporated into a variety of numerical simulation software packages that use a finite-discrete method solver. The patent focuses on predicting localized damage modeling using FEM-DEM methods. A multitude of mechanical properties and resulting effects in predicting natural fractures is analyzed and described. The application concentrates on the prediction, using intricate simulation models, fraction patterns in subsurface structures. The method disclosed, however, does not specifically investigate the presence of hydrocarbon accumulations.

SUMMARY OF THE INVENTION

A method for predicting a presence of hydrocarbon accumulations using a created mechanical properties model of a subsurface geological area is provided. The method comprises creating a plurality of presumed seismic sections at a time of deposition based on a seismic interpretation of the subsurface geological area and influences of tectonic time data and tectonic pressure data. A mechanical properties model of the subsurface geological area is created based on the plurality of presumed seismic sections at the time of deposition and the influences of tectonic time data and tectonic pressure data. The mechanical properties model is further analyzed for the presence of progradational surfaces. Using the analyzed position of progradational surfaces, the mechanical properties model is used for indicating the presence of hydrocarbon accumulations within the subsurface geological area.

The subsurface geological area is an area of the subsurface which is defined by its common geologic characteristics. The seismic interpretation of the subsurface geological area relates to geological information of the subsurface, in particular information about depositional structures or layers within the subsurface geological area. The seismic interpretation can be derived based on well log measurements and well log correlation between multilateral well models and outcrop models. An outcrop is a visible exposure of bedrock. The seismic section or seismic line is a display of seismic data along a line. A presumed seismic section at the time of deposition is a presumed display of seismic data along a line at the time of deposition. The presumed seismic section is a display of the seismic section with the presumed characteristics of the seismic section at the time of deposition. The presumed characteristics define the properties of the seismic sections as the properties of the seismic sections are estimated to have been at the time of deposition.

Tectonic impacts are the mechanical processes that have controlled the structure and properties of the earth's crust and its evolution through time. Tectonic time data refers to timerelated data describing these tectonic processes. Tectonic pressure data refers to pressure data describing the mechanical processes of tectonics.

The mechanical properties model described in this document is a computer-implemented model of mechanical properties of the subsurface geologic area and, in particular, a model of the subsurface geological area in which sections of the subsurface geological area are classified based on their mechanical properties. The mechanical properties model can be created using a geomechanics modelling simulator which includes a simulation engine using geomechanics to generate the mechanical properties model and also the presumed seismic sections, and, in particular, a 3D simulator with the capability of restoring and backstripping the data stored in the mechanical properties model.

The restoring of the data includes progressively undeforming the bodies or layers of rock in order to validate the interpretation used to build the mechanical properties model. Progressively undeforming describes the process of a backwards calculation of today's subsurface geological areas. The undeforming is done by calculating the initial shape of the layers in the subsurface geological areas before the subsurface geological areas were subjected to the forces that result of the mechanical processes of the tectonic processes. This calculating the undeforming comprises the calculation of a pre-deformation layer thickness of layers or bodies of rock in the subsurface geological area and the calculating further comprises using seismic sections for the estimation of the present day form of the subsurface geological area. The backstripping includes quantitatively estimating the thickness of the characterized bodies or layers of rock at the point of initial formation or deposition. Quantitatively estimating the thickness of the bodies or layers of rock includes calculating the deposition of sediment and the erosion of the sediment over time. The estimation of the backstripping allows to determine the initial thickness and mechanical characteristics of the facies in the subsurface geological area. Using the calculated characteristics of the bodies or layers of rock which were present at the time of the deposition, resulting mechanical stress and mechanical strain can be calculated.

The method for predicting the presence of hydrocarbon accumulations in the subsurface geological area is based on the concept, that the easiest correlatable sedimentary body is an undeformed layer cake stratigraphy. Therefore, the subsurface geologic area is first brought back in time through generating a plurality of the seismic sections. Generating the seismic section is done based on a seismic interpretation of the subsurface geological area and influences of tectonic time data and tectonic pressure data, removing all faults and folds, thereby creating a presumed geometry of the parasequences at the time of deposition. A fold is a stack of originally planar surfaces, such as sedimentary strata, that are bent or curved during permanent deformation. Such a layer cake stratigraphy for example enables the seismic correlation between well data from wells of interest. A forward geomechanics modelling then models the sediments forward through time to their present-day situation, in which all complexity of deformation is present again, but in which the high sediment characteristics remain visible as well.

The method outlined in this document is not based on the prior art concept of clinoforms, but on the so-called plummets, as described above. The plummet is characterized by a tectonic process, as was described in the introduction, and is a characteristic of basin margin strata and defined as a two-dimensional surface with a sigmoidal geometry. It has already been noted that the plummet is not a sedimentological feature, but the formation of the plummet is caused by the impact of tectonic processes that occurred simultaneously with the sediment supply.

The method for predicting the presence of hydrocarbon accumulations also considers structural and tectonic impacts. An improved geological modelling method compared to those of the prior art is provided.

The subsurface geological area can have one or more hydrocarbon reservoirs. The method enables to improve the modelling details of the field by introducing a high-resolution reservoir characterization in areas of interest. The high-resolution reservoir characterization considers structural and tectonic impacts. In this case, the method can further comprise the step of, for the hydrocarbon reservoirs, determining a location of the corresponding hydrocarbon reservoir based on the mechanical properties model and communicating information about the location of the hydrocarbon reservoir to enable extraction of the hydrocarbon from the one or more hydrocarbon reservoirs based on the determined locations of the one or more hydrocarbon reservoirs.

In one aspect, the step of creating the plurality of the presumed seismic sections at the time of deposition further comprises deriving the tectonic time data from the geometric features within the seismic interpretation. Sedimentary depositions leading to the formation of plummets can be identified using unique geometric configurations of bedding surfaces, as the depositional system was controlled by the tectonic processes. This enables internal characteristics of the subsurface geological area to be derived and recognized in well log measurements. In particular, stratal growth patterns reflect the kinematics and geometry of the growing folds and slip on the thrust faults and permit placing time constraints on how the geometrics evolved through time. Thus, based on knowledge of the tectonic processes, the corresponding tectonic time data can then be derived in a simple manner.

The step of creating a plurality of the presumed seismic sections at the time of deposition further comprises deriving the tectonic pressure data from geometric features within the seismic interpretation. In particular, mechanical models of faulting and the characteristic signature of thrust faults that occurred during sedimentation can be used to characterize corresponding depositions. Stratal growth patterns reflect the kinematics and geometry of the growing folds and slip on the thrust faults and permit placing time constraints on how the geometrics evolved through time. Based on the mechanical models of faulting the tectonic pressure data can then be derived in a simple manner.

The method can further comprise the steps of detecting boundaries in the plurality of the presumed seismic sections at the time of deposition, developing a model including an optimal well log correlation based on the boundaries, and adjusting the model including an optimal well log correlation based on the influences of tectonic time data and tectonic pressure data. In this context, the term boundaries refers to the upper boundaries and the lower boundaries of the different parasequences, which then define the boundaries of the plummets. Using the definition of these boundaries and applying them to the well logs, the seismic sections are overprinted with well log distributions of the plummets on top of another. The term "overprinting" describes correlating the well logs with the seismic sections stored in the model. Using the knowledge of the major depositional and erosional events over time, the contact between two of the plummets is thrusted. The created overprinted well log distribution then shows reservoir characteristics at a very high resolution. The reservoir characteristics are, for example, gamma ray values indicating the sediment type and density values in a meter scale. The plummets are then brought forward through time to the present-day situation using a geomechanics modelling simulator and by incorporating a series of deformation events. This forward calculation re-introduces the faults and folds in the area of interest stored in the mechanical properties model. The step of detecting boundaries in the plurality of the seismic sections can comprise using data from the gamma rays in so-called gamma ray spectroscopy. In a further non-limiting example, sonic data or measured density data could be used for the detecting of the boundaries. The gamma ray spectroscopy is a quick and nondestructive analytical technique. Using the gamma ray spectroscopy, various items of data regarding the subsurface area can be obtained. This data is then inputted for further processing and estimation of the location of the hydrocarbon reservoirs, as will be explained later.

The step of creating a mechanical properties model of the subsurface geological area further comprises evaluating a mechanical response of the one or more hydrocarbon reservoirs to the influences of the tectonic time data and the tectonic pressure data. The mechanical properties model is then created based on the mechanical response of the one or more hydrocarbon reservoirs to the influences of the tectonic time data and the tectonic pressure data. The presence of mechanical stresses, especially the presence of faults, within the area of hydrocarbon accumulations can lead to complex hydrodynamic effects within the hydrocarbon accumulations.

Changes in the reservoir pressure can lead to in-situ stress changes of the subsurface geological area. These changes in stress of the subsurface geological area are relevant for the distribution of the hydrocarbon within the ones of the hydrocarbon accumulations. Therefore, evaluating the mechanical response of hydrocarbon reservoirs to the influences of tectonic time data and tectonic pressure data and taking the mechanical response into account when creating the mechanical properties model will further led to place the wells correctly in the low strain zones within the hydrocarbon reservoirs. Similarly, rock mechanical properties can be calibrated with any petrophysical properties and then be used in the geomechanical modelling, wherein the petrophysical properties can include density, porosity, permeability, etc.

According to a further aspect of the invention, a method for determining a location of the one or more hydrocarbon reservoirs in a subsurface geological area is provided. The method comprises the step of creating the mechanical properties model of the subsurface geological area that includes one or more hydrocarbon reservoirs using the method for creating a mechanical properties model as described above. The location of the hydrocarbon reservoirs is determined based on the mechanical properties model.

Thus, an improved method for determining the locations of the hydrocarbon reservoirs in a subsurface geological area is provided, which takes into account structural and tectonic impacts, and wherein a fast and easy routine to improve the modelling details of a field by introducing a high-resolution reservoir characterization in problem areas with structural and tectonic impacts is used.

According to another aspect of the invention, an apparatus for creating a mechanical properties model of a subsurface geological area is provided, wherein the apparatus comprises one or more processors including a seismic section module processor, which is configured to determine a plurality of presumed seismic sections at the time of deposition based on a seismic interpretation of the subsurface geological area and influences of tectonic time data and tectonic pressure data, and a mechanical properties module, which is configured to create a mechanical properties model of the subsurface geological area based on the plurality of presumed seismic sections at the time of deposition and the influences of tectonic time data and tectonic pressure data.

The apparatus takes into account the concept, that the easiest correlatable sedimentary body is an undeformed layer cake stratigraphy. Therefore, the subsurface geological area is first modelled to reflect its structure in the distant past through generating a plurality of seismic sections based on a seismic interpretation of the subsurface geological area and influences of tectonic time data and tectonic pressure data, removing all faults and folds, and thereby creating a presumed geometry of the parasequences at the time of deposition. Such a layer cake stratigraphy then, for example, enables the seismic correlation between wells of interest. The next step involves a forward geomechanics modelling which models the sediments forward through time to their present-day situation. These forward calculated sediments include the complexity caused by the deformation. In these forward calculated sediments of the mechanical properties model the sediment characteristics are visible in high resolution.

The apparatus is configured to execute the method which, as noted above, is not based on clinoforms, but on the concept of the plummets. The apparatus also takes into account structural and tectonic impacts. Therefore, an improved device for creating a mechanical properties model of a subsurface geological area is described in this document.

The subsurface geological area can include one or more hydrocarbon reservoirs and the apparatus can further comprise a reservoir module which is configured to determine a location of the hydrocarbon reservoirs based on the mechanical properties model.

The processor can comprise a tectonic time derivation module which is configured to derive the tectonic time data from the geometric features within the seismic interpretation. The depositions can be identified using unique geometric configurations of bedding surfaces, as the depositional system was controlled by the tectonic activity. The internal characteristics of the subsurface geological area can be derived and recognized in well log measurements. In particular, the stratal growth patterns reflect the kinematics and the geometry of the growing folds and slip on the thrust faults and permit placing time constraints on how the geometry evolved through time. Thus, based on knowledge of the tectonic processes, corresponding tectonic time data can then be derived in a simple manner.

The processor can also comprise a tectonic pressure data module which is configured to derive the tectonic pressure data from the geometric features within the seismic interpretation. The depositions can be identified using unique geometric configurations of bedding surfaces as the depositional system is controlled by the tectonic activity. The internal characteristics of the subsurface geological area can be derived and recognized in well log measurements. In particular, stratal growth patterns reflect the kinematics and geometry of the growing folds and slip on the thrust faults and permit placing time constraints on how the geometrics evolved through time. Based on the mechanical models of faulting the tectonic pressure data can then be derived in a simple manner.

In one aspect the apparatus further comprises a detector which is configured to detect boundaries in the plurality of presumed seismic sections at the time of deposition, a model developing module which is configured to develop a model including an optimal well log correlation based on the boundaries, and a model adjusting module which is configured to adjust the model including an optimal well log correlation based on the influences of tectonic time data and tectonic pressure data. Boundaries describe the upper and lower boundaries of the different parasequences, and, in particular, the boundaries of the plummets. Using the definition of these boundaries in the well logs, the seismic sections could then be overprinted with well log distributions of the plummets with the parasequences on top of another. By applying the knowledge of major depositional and erosional events, the contact between two plummets can be chosen to be thrusted. The distribution then shows characteristics of the hydrocarbon reservoirs at a very high resolution. The model then allows a modelling of the plummets through time using the geomechanics modelling simulator to the present-day situation by incorporating a series of deformation.

The detection of the information of the subsurface region can be done using the gamma ray detection spectroscopy. In this aspect of the present invention, a gamma ray source is used to detect the boundaries. This is done by emitting and receiving gamma rays emitted from the gamma ray source. Gamma-ray spectroscopy is a quick and nondestructive analytical technique that can be used to detect the boundaries.

In a further aspect, the apparatus further comprises an evaluating device which is configured to evaluate a mechanical response of the one or more hydrocarbon reservoirs to the influences of the tectonic time data and the tectonic pressure data, wherein the second creating device is configured to also create the mechanical properties model based on the mechanical response of the one or more hydrocarbon reservoirs to the influence of tectonic time data and tectonic pressure data. The presence of mechanical stresses, especially the presence of faults, within the area of hydrocarbon accumulations can lead to complex hydrodynamic effects within the hydrocarbon accumulations. Changes in the reservoir pressure can lead to in-situ stress changes of the subsurface geological area that can be calculated by the apparatus. These changes in stress of the subsurface geological area are relevant for the distribution of the hydrocarbon within the ones of the hydrocarbon accumulations. Therefore, evaluating the mechanical response of hydrocarbon reservoirs to the influences of tectonic time data and tectonic pressure data and taking the mechanical response into account when creating the mechanical properties model will further led to place the wells correctly in the low strain zones within the hydrocarbon reservoirs. Similar, rock mechanical properties can be calibrated with any petrophysical properties and then be used in the geomechanical modelling, wherein the petrophysical properties can be density, porosity, permeability, etc.

According to another aspect of the invention, a system for determining a location of one or more hydrocarbon reservoirs in a subsurface geological area is disclosed. The method comprises an apparatus for creating a mechanical properties model of a subsurface geological area as described above and a determining device which is configured to determine the location of the hydrocarbon reservoirs based on the mechanical properties model.

Therefore, a system for determining a location of the hydrocarbon reservoirs in a subsurface geological area is provided. The system comprises an apparatus for creating a mechanical properties model of a subsurface geological area that also takes into account structural and tectonic impacts. In particular, a system is provided that comprises an apparatus that is configured to execute a routine to improve the modelling details of a field by introducing a high-resolution reservoir characterization in problem areas with structural and tectonic impacts.

Therein, as the determination of a location of the hydrocarbon reservoirs is based on an improved geological modelling apparatus, also the determination of the location of the hydrocarbon reservoirs can be improved. Therefore, a system is provided which comprises a device for predicting a presence of one or more hydrocarbon reservoirs in a subsurface geological area. The system takes into account structural and tectonic impacts, and therefore offers an improved device for predicting the presence of one or more hydrocarbon reservoirs in a subsurface geological area. In particular, a system is provided that comprises a device that is configured to execute a routine to improve the modelling details of a field by introducing a high-resolution reservoir characterization in problem areas with structural and tectonic impacts.

The extraction of hydrocarbon is based on an improved apparatus for creating a mechanical properties model of the subsurface geological area and thus the use of the mechanical properties model enables improvement of extraction of hydrocarbons. It will be appreciated that the extracting device can, for example, be an oil drilling equipment.

A computer program product is also disclosed which comprises a computer-readable storage medium that stores instructions which, when carried out by a processor, execute a method for creating a mechanical properties model of a subsurface geological area as described above.

The computer program product comprises a computer-readable storage medium that stores instructions which, when carried out by the processor, execute a method for creating a mechanical properties model of a subsurface geological area that also takes into account structural and tectonic impacts. In particular, a routine to improve the modelling details of the hydrocarbon reservoir by introducing a high-resolution reservoir characterization in problem areas with structural and tectonic impacts is disclosed. The routine uses, for example, available the well logs, for example using sonic data and density data, to calculate the mechanical properties, and carrying out the instructions of the computer program product further comprises using well known equations such as, for example, Terzaghi's principle. Terzaghi's principle states that when stress is applied to a porous material, it is opposed by the fluid pressure filling the pores in the material.

DETAILED DESCRIPTION OF THE INVENTION

Geologic modelling is usually used to create a computer-based representation of a region of the earth's subsurface, a geologic model. Such models can then be used to model a hydrocarbon reservoir or a depositional basin. Further, after their formation, the geological model can be used for many purposes. For example, the geological model can be used as input to a computer program that simulates the movement of fluids within the modeled subsurface region. These programs can then again be used to predict hydrocarbon production rates, volumes from hydrocarbon reservoirs over time, etc.

Figure 1:
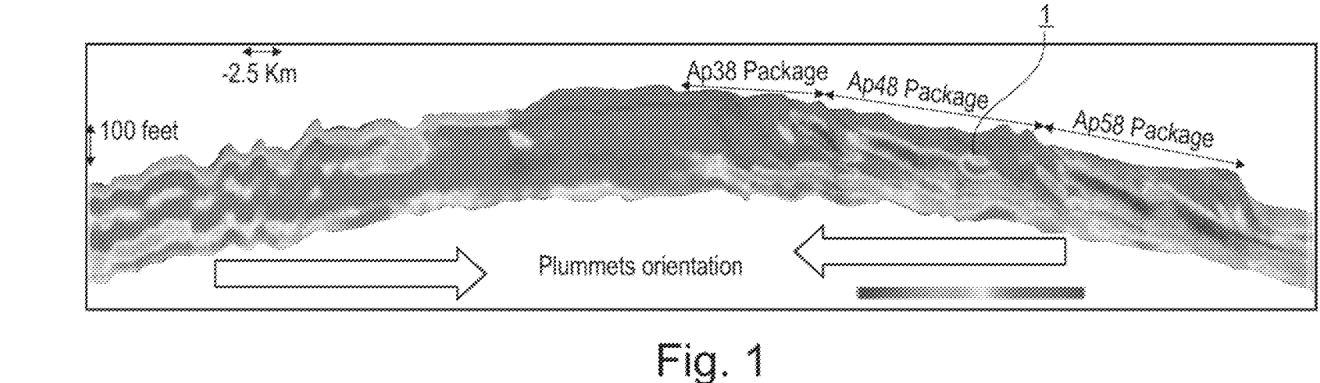
FIG. 1 illustrates a clinoform.

As is outlined in the introduction, the geologic modelling of the subsurface area can be based on different geological features, such as clinoforms or plummets. FIG. 1 illustrates a clinoform 1, such as one known in the Abu Dhabi fields.

The clinoforms are defined as sloping depositional surfaces and are deposited free from wave disturbance and where the continental shelf has regressed as sea level falls. The composition of the clinoform is primarily mud dominant and fossils are non-abundant. Rock properties used in the identification of clinoforms are defined as having fine grain size in order to be carried by suspension, thin and even bedding, and the presence of flow markings and flutings/striations as evidence for gravity flows.

This description can, however, not be applied in regions which show a tectonic break and must be fitted with the regional tectonics as, for example, in Abu Dhabi. In particular, as can be seen in FIG. 1, the clinoforms in such a region already do not show consistent slope and shelf correlations and show different and inverted dip directions, what is assumed to be not logically for a realistic geological feature. There are also no facies changes and the main orientation is parallel to the master fault trends.

It is, therefore, necessary to update static models of these Abu Dhabi fields to a level in order to improve the recovery factor, as a heterogeneous reservoir will not be depleted equally throughout the field. Therefore, it is useful to gain insight into the build-up of specific target areas within a reservoir to judge factors that have the largest influence on production, like compartmentalization, flow paths and fault pattern.

Figure 2:
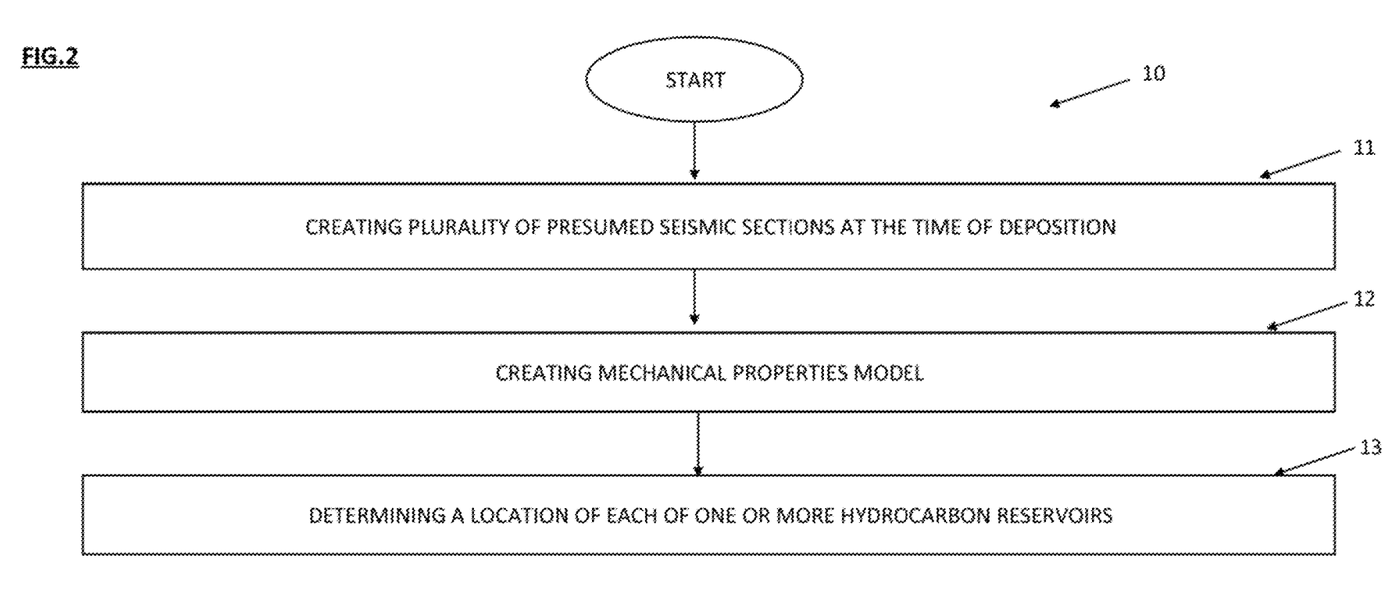
FIG. 2 illustrates a flow chart of a method for creating a mechanical properties model of a subsurface geological area, according to a first aspect of the invention.

FIG. 2 illustrates a flow chart of a method 10 for creating a mechanical properties model of a subsurface geological area, according to a first aspect of the invention. The method 10 comprises the steps of creating a plurality of presumed seismic sections at the time of deposition based on a seismic interpretation of the subsurface geological area and influences of tectonic time data and tectonic pressure data in step 11. A mechanical properties model of the subsurface geological area is created based on the plurality of presumed seismic sections at the time of deposition and the influences of tectonic time data and tectonic pressure data in step12.

The method 10 is based on the concept that the easiest correlatable sedimentary body is an undeformed layer cake stratigraphy. Therefore, the method 10 first models the subsurface geological area back in time by generating a plurality of seismic sections based on a seismic interpretation of the subsurface geological area and influences of tectonic time data and tectonic pressure data, removing all faults and folds, and hereby creating a presumed geometry of the parasequences at the time of deposition. Such a "layer cake stratigraphy" for example enables the seismic correlation between well data from wells of interest. A forward geomechanics modelling models the sediments forward through time to their present-day situation, in which all complexity of deformation is present again, but in which the high sediment characteristics are still visible as well. As noted previously, the method 10 is not based on clinoforms, but on so called plummets. The plummets are characterized by a tectonic event growth. The plummet is a characteristic of basin margin strata and defined as a two-dimensional surface with a sigmoidal geometry. In particular, a plummet is not a sedimentological feature, but it is originated due to the impact of tectonics that worked simultaneously with the sediment supply.

Therefore, the method 10 also takes into account structural and tectonic impacts to create the mechanical properties model of a subsurface geological area. The subsurface geological area includes one or more hydrocarbon reservoirs and so the method 10 enables a routine to improve the modelling details of a field by introducing a high-resolution reservoir characterization in problem areas with structural and tectonic impacts is provided.

The step 11 of creating a plurality of presumed seismic sections at the time of deposition 11 further comprises deriving tectonic time data and tectonic pressure data from geometric features within the seismic interpretation.

According to mechanical models of faulting, the strike slip faulting is evolved when $\sigma 2$ is the vertical stress and $\sigma 1$ and $\sigma 3$ are the maximum and minimum horizontal stresses, respectively. Where the maximum compressive stress $\sigma 1$ is at acute angles to fractures between the master fault segments, these fractures lead to rotation of the stresses and $\sigma 3$ will be subvertical leading to plummet thrust. The plummet normal is evolved when $\sigma 1$ is replacing $\sigma 3$.

Further, movement of the hanging-wall up and over the footwall material creates the canonical stratigraphic signature of a thrust fault: older rocks are placed above younger rocks, wherein the stratigraphy is repeated. This characteristic signature of thrust faults is something that can be used to recognize thrust faults even if the thrust faults have subsequently been folded or reactivated as normal faults. Listric geometries, which are caused by gravitational gliding of the faults, are common, as are sub horizontal segments linked by short dipping segments. The short dipping segments are commonly referred to as flats and ramps. Movement of material above ramps and flats requires deformation of the material in the hanging-wall of the thrust, in particular, ramp-flat geometries are associated with characteristic folds in the hanging-walls of thrusts called fault bend folds. The folds are often associated with blind faults. Since a blind fault terminates in the middle of the rock mass, offset along the fault has to be transferred into more distributed strain past the buried fault tip. The folds form at the tips of blind faults. More generally, when the slip rate along a fault exceeds the rate with which the fault tip itself propagates, the fault will be blind for much of its history and fault propagation folds form. Thrust faults and their folds are occurring during sedimentation characterizing the plummets.

Stratal growth patterns reflect the kinematics and geometry of the growing folds and slip on the thrust faults and permit placing tight time constraints on how the geometries evolved through time. This is analogous to growth strata in extensional environments. Fold and thrust belts are commonly associated with the deformation of layered sediments. The sedimentary layering provides a preexisting mechanical anisotropy along which faults propagate. That is, sedimentary layering provides ideal initial conditions for ramp-flat geometries. It should be noted that, although thrusts usually did not move simultaneously, this effect only plays a minor role in the formation of the sedimentary layering.

The method further comprises a step 13 of determining a location the one or more hydrocarbon reservoirs based on the mechanical properties model.

Figure 3:
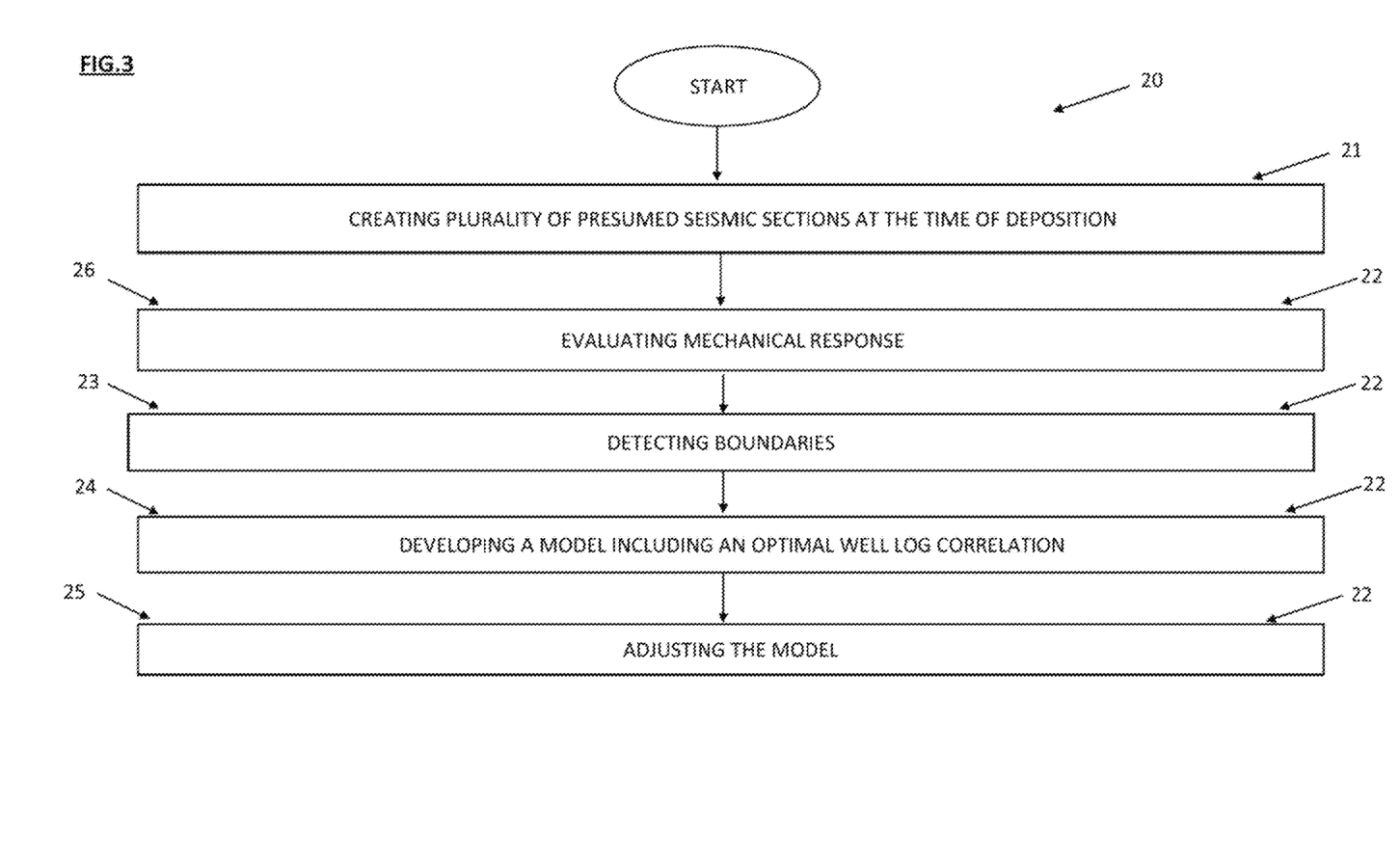
FIG. 3 illustrates a flow chart of a method for creating a mechanical properties model of a subsurface geological area, according to a second aspect of the invention.

FIG. 3 illustrates a flow chart of a method 20 for predicting a presence of one or more hydrocarbon reservoirs in a subsurface geological area.

As shown in FIG. 3, the method 20 comprises a step 21 of creating a plurality of presumed seismic sections at the time of deposition based on a seismic interpretation of the subsurface geological area and influences of tectonic time data and tectonic pressure data. Further, a mechanical properties model of the subsurface geological area is created in step 22 based on the plurality of presumed seismic sections at the time of deposition and the influences of tectonic time data and tectonic pressure data.

Therein, according to the method shown in FIG. 3, the step 22 of creating a mechanical properties model further comprises the step 23 of detecting boundaries in the plurality of presumed seismic sections at the time of deposition, developing in step 24 a model including an optimal well log correlation based on the boundaries, and adjusting the model including an optimal well log correlation based on the influences of tectonic time data and tectonic pressure data 25.

The easiest correlatable sedimentary body is an undeformed layer cake stratigraphy. Therefore, a corresponding 3D geomechanics modelling simulator can attempt to bring the sediment back in time, removing all faults and folds, hereby creating a presumed geometry of the parasequences at the time of deposition. Once a correlation is constructed, the lower and upper boundaries of the different parasequences can be defined in the seismic sections. Using the definition of these boundaries in the well logs, the seismic sections can then be overprinted with well log distributions of the plummets with the parasequence on top of another. By applying the knowledge of major depositional and erosional events, the contact between two plummets can be chosen to be thrusted. The created distribution shows reservoir characteristics like gamma ray and density at a very high resolution. However, the created image is still representing the state of the sediments at time of deposition, providing an oversimplistic view on the present-day situation. Therefore, the model enables a modeling wherein the plummets are brought forward through time to the present-day situation by incorporating a series of deformation events that re-introduce the faults and folds in the area. The resulting model of gamma ray, neutron, density and acoustic velocity distributions is used to create a synthetic seismic section that can then be evaluated and compared with the original seismic data. Virtual wells can be drilled in order to compare the modelled log distributions to original log signals, as well as predict log signals in areas where no wells were drilled before. A step 23 of detecting boundaries in the plurality of seismic sections comprises using data collected using gamma rays to detect the boundaries.

Further, in the method 20, the step 22 of creating a mechanical properties model of the subsurface geological area further comprises the step of evaluating a mechanical response of the one or more hydrocarbon reservoirs to the influences of tectonic time data and tectonic pressure data in step 26. The mechanical properties model is also created in step 26 based on the mechanical response of the one or more hydrocarbon reservoirs to the influence of tectonic time data and tectonic pressure data.

Figure 4:
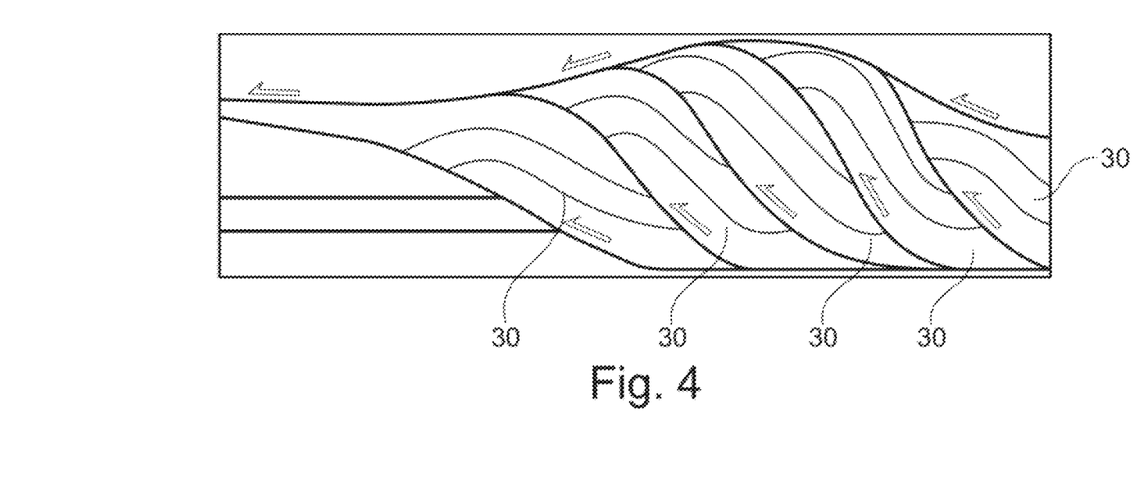
FIG. 4 illustrates the so-called plummets.

FIG. 4 illustrates the plummets 30 and, in particular, FIG. 4 illustrates plummets 30 thrusts that are formed in response to strike slip faults. As can be seen in FIG. 4, the surface of a plummet 30 is a low-angle thrust fault with ramp-flat geometry, indicating that the thrust moved horizontally, stepping upwards through stratigraphic layers. In particular, the plummet 30 is a characteristic of basin margin strata and defined as a two-dimensional surface with sigmoidal geometry.

The plummet 30 is not a sedimentological feature but the plummet 30 is originated due to the impact of tectonic processes that worked simultaneously with the sediment supply. In particular, the plummets 30 are acting as a thrust component, wherein the plummets 30 are acting syndespositional in response to compressive forces leading to form closures at the top roof.

Figure 5:
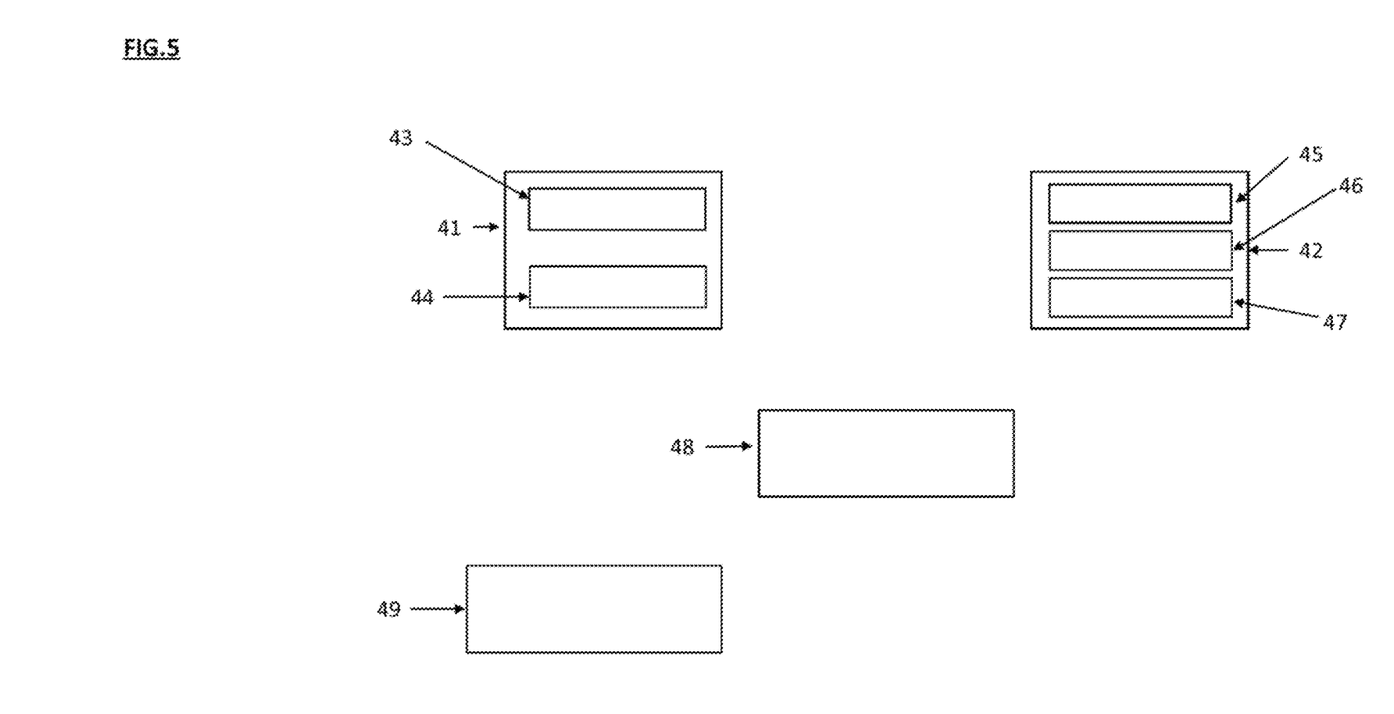
FIG. 5 illustrates an apparatus for creating a mechanical properties model according to different aspects of the invention.

FIG. 5 illustrates an apparatus 40 for creating the mechanical properties model. The apparatus 40 comprises a first creating device 41 which is configured to create a plurality of presumed seismic sections at the time of deposition based on a seismic interpretation of the subsurface geological area and influences of tectonic time data and tectonic pressure data The apparatus 40 further comprises a second creating device 42 which is configured to create a mechanical properties model of the subsurface geological area based on the plurality of presumed seismic sections at the time of deposition and the influences of tectonic time data and tectonic pressure data.

The first creating device 41 and the second creating device 42 can, for example, be a simulation engine or a computing device that is configured to execute the geomechanics modelling simulator. The computing device comprises at least one processor and at least one memory. The processor is used for the calculation or execution of the geomechanics modelling simulator. The memory is used for the storing of the calculated geomechanics modelling simulator.

Furthermore, as shown in FIG. 5, the first creating device 41 further comprises a first deriving device 43 which is configured to derive the tectonic time data from geometric features within the seismic interpretation. The first creating device 41 also comprises a second deriving device 44 which is configured to derive the tectonic pressure data from geometric features within the seismic interpretation. The first deriving device 43 and the second deriving device 44 are computing devices that are configured to analyze a seismic interpretation and data derived from well log measurements.

According to the aspects of FIG. 5, the second creating device 42 comprises a detecting device 45 which is configured to detect boundaries in the plurality of presumed seismic sections at the time of deposition. The second creating device 42 comprises a developing device 46 which is configured to develop a model including an optimal well log correlation based on the boundaries. The second creating device 42 also comprises an adjusting device 47 which is configured to adjust the model including an optimal well log correlation based on the influences of tectonic time data and tectonic pressure data.

The first detecting device 45 can be a computing device (as described above) that is configured to analyze a seismic interpretation and data derived from well log measurements. The developing device 46 can also be a simulation engine, respectively a computing device that is configured to simulate a well log correlation. The adjusting device 47 can be a simulation engine or a computing device that is configured to execute a geomechanics modelling simulator.

The apparatus 40 further comprises an evaluating device 48 which is configured to evaluate a mechanical response of the one or more hydrocarbon reservoirs to the influences of tectonic time data and tectonic pressure data, wherein the second creating device 42 is configured to also create the mechanical properties model. Creating the mechanical properties model is done based on the mechanical response of the one or more hydrocarbon reservoirs to the influence of tectonic time data and tectonic pressure data.

There is also shown a determining device 49 which is configured to determine a location of the one or more hydrocarbon reservoirs and which, together with the apparatus 40, forms a system for determining the location of the one or more hydrocarbon reservoirs.

The invention claimed is:

1. A method for determining a location of hydrocarbon reservoirs using a created mechanical properties model of a subsurface geological area, the method comprising the following steps executed by a computer:
   receiving gamma rays data, sonic data or measured density data measured in well logs in the subsurface geological area;
   deriving tectonic time data and tectonic pressure data using a seismic interpretation of the subsurface geological area and the data from well log measurements;
   generating a plurality of presumed seismic sections at time of deposition based on the seismic interpretation of the subsurface geological area and of the derived tectonic time data and tectonic pressure data;
   detecting boundaries in the plurality of presumed seismic sections at the time of deposition using the received gamma rays data, sonic data or measured density data;
   creating a mechanical properties model of the subsurface geological area based on the plurality of presumed seismic sections at the time of deposition and the influences of tectonic time data and tectonic pressure data; and the detected boundaries in the plurality of presumed seismic sections at the time of deposition;
   analyzing the mechanical properties model of the subsurface geological area to determine presence and position of progradational surfaces in the subsurface geological area; and
   determining, by a determining device, the location of the hydrocarbon reservoir in the subsurface geological area using the position of the progradational surfaces.

2. The method according to claim 1, wherein the subsurface geological area comprises a plurality of hydrocarbon reservoirs.

3. The method according to claim 1, wherein the step of creating a mechanical properties model further comprises the steps of:
   developing a model including an optimal well log correlation based on the boundaries; and
   adjusting the model including an optimal well log correlation based on the derived tectonic time data and tectonic pressure data.

4. The method according to claim 1, wherein the step of creating a mechanical properties model of the subsurface geological area further comprises evaluating a mechanical response of the one or more hydrocarbon reservoirs to the derived tectonic time data and tectonic pressure data, wherein the mechanical properties model is also created based on the mechanical response of the one or more hydrocarbon reservoirs to the influence of tectonic time data and tectonic pressure data.

5. A system configured to determine a location of one or more of one or more hydrocarbon reservoirs in a subsurface geological area, wherein the system comprises:
   an apparatus configured to create a mechanical properties model of a subsurface geological area, the apparatus comprising
   means configured to receive gamma rays data, sonic data or measured density data measured in well logs in the subsurface geological area;
   a first deriving device configured to derive tectonic time data from geometric features within a seismic interpretation and the data from well log measurements;
   a second deriving device configured to derive tectonic pressure data from geometric features within the seismic interpretation and the data from well log measurements;
   a first creating device which is configured to create a plurality of presumed seismic sections at the time of deposition based on the seismic interpretation of the subsurface geological area and the derived tectonic time data and tectonic pressure data; and
   a detecting device configured to detect boundaries in the plurality of presumed seismic sections at the time of deposition using the received gamma rays data, sonic data or measured density data; and
   a second creating device which is configured to create a mechanical properties model of the subsurface geological area based on the plurality of presumed seismic sections at the time of deposition and the derived tectonic time data and tectonic pressure data, and the detected boundaries in the plurality of presumed seismic sections at the time of deposition;
   the system further comprising:
   a determining device, configured to analyze the mechanical properties model of the subsurface geological area to determine presence and position of progradational surfaces in the subsurface geological area, and to determine the location of one or more of one or more hydrocarbon reservoirs in the subsurface geological area using the position of the progradational surfaces.

6. The apparatus according to claim 5, wherein the second creating device further comprises a developing device which is configured to develop a model including an optimal well log correlation based on the boundaries, and an adjusting device which is configured to adjust the model including an optimal well log correlation based on the derived tectonic time data and tectonic pressure data.

7. The apparatus according to claim 5, wherein the apparatus further comprises an evaluating device which is configured to evaluate a mechanical response of the one or more hydrocarbon reservoirs to the derived tectonic time data and tectonic pressure data, wherein the second creating device is configured to also create the mechanical properties model based on the mechanical response of the one or more hydrocarbon reservoirs to the derived tectonic time data and tectonic pressure data.

* * * * *